United States Patent [19]

Austin et al.

[11] Patent Number: 4,985,975
[45] Date of Patent: Jan. 22, 1991

[54] SYSTEM FOR ATTACHING A FITTING TO A TUBE

[75] Inventors: John S. Austin, Atlantic Beach; Jeff D. Gruenberg, Jacksonville, both of Fla.

[73] Assignee: Unidynamics Corporation, Jacksonville, Fla.

[21] Appl. No.: 456,158

[22] Filed: Dec. 22, 1989

[51] Int. Cl.$^5$ .............................................. B23Q 3/00
[52] U.S. Cl. ...................... 29/283.5; 29/237; 29/523; 285/382.7; 285/39; 403/278; 403/279
[58] Field of Search ................ 29/237, 234, 281.1, 29/283.5, 238, 507, 523; 403/278, 279; 285/382.7, 382, 39, 18; 72/117, 122, 316, 355

[56] References Cited

U.S. PATENT DOCUMENTS

| | | |
|---|---|---|
| 3,660,884 | 5/1972 | Kowal ................................. 29/237 |
| 3,711,132 | 1/1973 | Nickerson ...................... 285/382.4 |
| 4,641,407 | 2/1987 | Blevins et al. ..................... 29/237 |

FOREIGN PATENT DOCUMENTS 149232 12/1952 Australia ............................. 29/507

Primary Examiner—P. W. Echols
Assistant Examiner—David P. Bryant
Attorney, Agent, or Firm—Fitzpatrick, Cella, Harper & Scinto

[57] ABSTRACT

The present invention includes a system and a method for attaching the end of a tube of a plastically deformable material such as titanium to a hard metal fitting in a manner that can provide the resulting tube joint with increased strength and fatigue resistance. In the method the tube and fitting are assembled by inserting the tube into the end of a bore in the fitting. A radial force is exerted against a predetermined axial length of the tube wall, and thus also against the fitting, to plastically deform the tube wall radially into plural, axially spaced, circumferential grooves in the fitting bore. While this radial force is being exerted, a die restrains the fitting, causing it to deform elastically more near the end of the fitting bore than near the end of the tube. In the resulting tube joint the fitting applies residual circumferential stresses to the tube that are larger near the end of the fitting bore, and this stress distribution increases the fatigue resistance of the tube joint.

7 Claims, 3 Drawing Sheets

SYSTEM FOR ATTACHING A FITTING TO A TUBE

BACKGROUND OF THE INVENTION

1. Field of the Invention

The present invention relates to a method and system for making a tube joint and, more particularly, to a method and system for attaching a fitting to a plastically deformable tube.

2. Description of the Prior Art

Tubing for any kind of fluid system must be provided with fittings to attach different tubing sections to each other and to other components of the system. There are many different techniques for securing fittings to tubing sections, including welding, brazing and connecting them together mechanically. For many applications, the technique used to secure the fitting and tubing is not critical to the integrity of the fluid system.

However, there are tubing systems, such as those used in aerospace applications, which require the connection between the tube and fitting to meet very stringent requirements. One such tube joint is shown in U.S. Pat. No. 3,711,132, assigned to Resistoflex Corporation, a subsidiary of the assignee of the present invention. The bore of the fitting shown in this patent has a plurality of internal, axially-spaced, circumferential grooves. The fitting slides over the end of the tube, which is then plastically expanded into the internal grooves in the bore. The geometry of the grooves is altered in a manner that substantially increases the maximum stress level for flexure endurance strength (a standard critera in the aerospace industry for quantitatively expressing the strength and fatigue resistance of a tube joint).

The fitting in U.S. Pat. No. 3,711,132 was a significant improvement over prior art fittings at the time, and provided a tube joint exhibiting superior performance. However, more stringent operating conditions now being envisioned in the aerospace industry make it preferable to have a tube joint capable of withstanding an even higher maximum stress level before flexure failure.

SUMMARY OF THE INVENTION

It is an object of the present invention to provide a method of attaching a tube to a fitting that results in a tube joint having greater strength and fatigue resistance than prior art tube joints.

In accordance with one aspect of the invention, a method of attaching a plastically deformable tube to a fitting having a bore for forming a sliding fit with the tube, which bore has plural, axially spaced grooves, comprises the steps of assembling the tube and the fitting so that an end of the tube enters an end of the fitting bore and the tube wall and the fitting bore face each other, and exerting a radial force against the tube wall to plastically deform the tube wall into plural grooves in the fitting bore, while causing the fitting to elastically deform a greater amount proximate to the end of the bore than proximate to the end of the tube.

In accordance with another aspect of the invention, a system is provided for attaching the end of a plastically deformable tube to a fitting having a bore an end of which forms a sliding fit with the tube, the bore having plural, axially spaced grooves into which the tube wall is expanded by radial deformation thereof against the bore while the fitting is restrained radially by a die. In the inventive system the die and the fitting have facing surfaces that form a radial gap that is larger proximate to the end of the bore than proximate to the end of the tube and the gap causes elastic deformation of the fitting during radial expansion of the tube.

In accordance with yet another aspect of the invention, a tube joint comprises a fitting having a bore with plural, axially spaced grooves and a plastically deformed tube having an end disposed within an end of the bore along a predetermined axial length thereof and extending into the grooves, wherein the tube is circumferentially stressed by the fitting a greater amount proximate to the end of the bore than proximate to the end of the tube.

BRIEF DESCRIPTION OF THE DRAWINGS

The present invention will be better understood by reference to the detailed description of preferred embodiments that follows, when taken in conjunction with the drawings, in which.

DETAILED DESCRIPTION OF PREFERRED EMBODIMENTS

Figure 1:
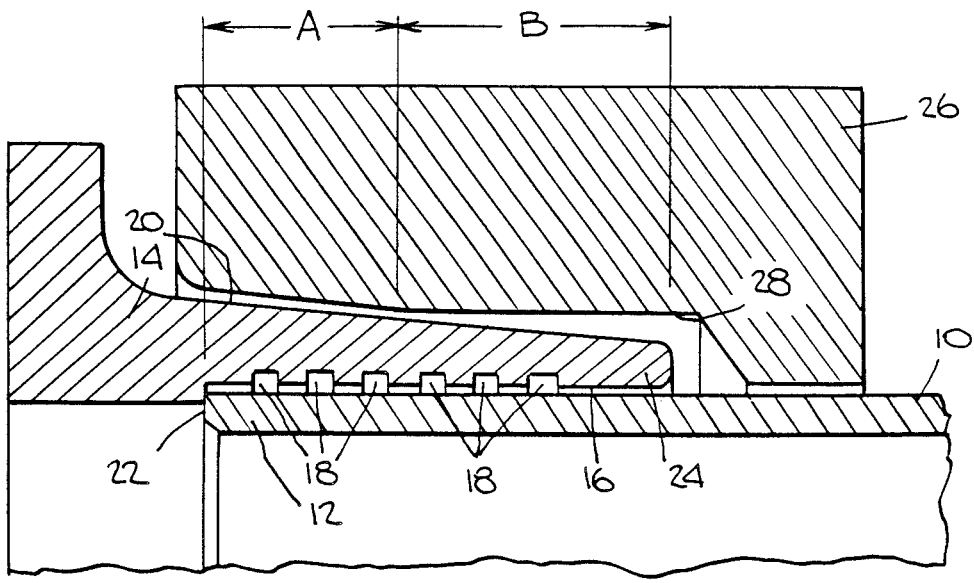
FIG. 1 depicts apparatus for performing one embodiment of the method of the present invention.

FIG. 1 illustrates apparatus set up for performing one embodiment of the method of the present invention.

A tube 10 includes a thin wall 12 made of a plastically deformable material. For aerospace applications suitable materials for the tube are titanium alloys, Inconel ®, stainless steels and aluminum. A fitting 14 has a bore 16 that forms a sliding fit with the tube wall 12. For aerospace applications suitable materials for the fitting are titanium, stainless steels and Inconel. The fitting bore 16 has plural, axially spaced circumferential grooves 18 that are continuous around the bore 16. The tube 10 and fitting 14 are assembled as shown in FIG. 1, with the tube wall 12 facing the bore 16 and the grooves 18. The outside surface 20 of the fitting corresponding to the bore 16 tapers radially in the axial direction along the bore, getting smaller in diameter from a location near the end 22 of the tube 10 to the end 24 of the fitting. In the present embodiment, the outside surface 20 of the fitting bore tapers at a constant angle.

A die 26 is disposed around the outside surface 20 of the fitting 14. The die 26 comprises a relatively large, unyielding mass of hardened tool steel. The die has an inner surface 28 that faces the outside surface 20 of the fitting bore 16. The inner surface 28 has two portions A and B axially along the bore 16 of the fitting from the end 22 of the tube to the end 24 of fitting. The first portion A is tapered at the same constant angle as the outside surface 20 of the fitting bore. The second portion B tapers at a smaller constant angle so that the radial gap between the outside surface 20 of the fitting and the inside surface 28 of the die increases toward the end 24 of the fitting.

In a typical set-up like that shown in FIG. 1, using a titanium tube with a 1" diameter and a fitting made of titanium, the radial gap between the outside surface 20 of the fitting and the inside surface 28 of the die is a constant 0.002" in portion A, increasing to 0.0125" at the end 24 of the fitting in portion B. The size of the gap is exaggerated in FIG. 1 for purposes of illustration.

Figure 2:
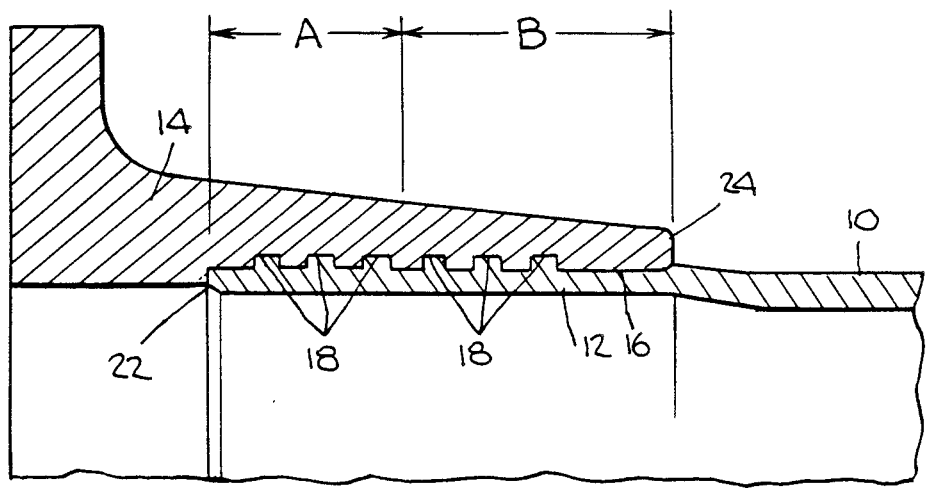
FIG. 2 depicts a tube joint in accordance with the present invention made using the apparatus depicted in FIG. 1.

Once the tube 10 and fitting 14 have been assembled as shown in FIG. 1, and the die 26 is in place, the tube wall 12 is expanded radially by roll swaging in a manner that is well-known to those skilled in the art, to provide the tube joint shown in FIG. 2.

The roll swaging operation plastically deforms the tube wall 12 radially outwardly along a predetermined axial length (in this embodiment from the end 22 of the tube to the end 24 of the fitting), so that the material of the tube wall enters the grooves 18 in the tube bore 16. The tube wall 12 is thus thinned along this predetermined axial length. During roll swaging, the fitting 14 deforms elastically in portion A a constant amount, determined by the constant radial clearance between the outside surface 20 of the filling bore 16 and the inside surface 28 of the die 26. In portion B the fitting elastically deforms a varying amount, beginning with the deformation it experiences in portion A to a maximum at the end 24 of the fitting. The amount of radial deformation of the fitting 14 is thus controlled by the inside surface 28 of the die 26. Although FIG. 2 shows a major portion of the grooves 18 filled with material from the tube wall 12, the grooVes near the end 24 of the fitting may be less completely filled with tube material. Additionally, the inside diameter of the tube may vary slightly; for example, with the geometry and materials discussed above the inside diameter of the tube may be about 0.003" smaller near the end 24 of the fitting. This variation will not adversely affect the performance of the tube joint.

A tube joint in accordance with the present invention, for example, as shown in FIG. 2, produces a more gradual transition from the undeformed portion of the tube wall (extending beyond the end 24 of the fitting) and the plastically deformed portion of the tube wall (within the fitting bore). Thus, undesirable stresses are not created in the tube wall in this vicinity.

One important aspect of the tube joint shown in FIG. 2 is the presence of residual circumferential stresses on the tube wall 12 in portion B that increase beginning at the boundary between portions A and B to a maximum at the end 24 of the fitting 14. These circumferential stresses are created by relaxation of the fitting 14 after roll swaging, since the fitting is elastically deformed against the inside surface 28 of the die during the roll swaging operation. Since the tube wall 12 is plastically deformed during roll swaging, the tube only partially relaxes afterward, and the fitting therefore contracts against the tube wall 12. Since the tube wall 12 and fitting 14 expand during roll swaging a greater amount in portion B than in portion A, the fitting places greater residual circumferential stress on the tube wall in portion B afterward. And because the radial clearance between the fitting and the die increases to a maximum at the end 24 of the fitting, the residual circumferential stress on the tube wall increases to a maximum at the end of the fitting.

This pattern of increased circumferential stress distribution in the tube is believed to contribute to the integrity of the tube joint in at least three ways.

Initially, it increases the "grip" of the fitting on the tube. This increased gripping force enhances fatigue resistance by minimizing the possibility of relative motion between the tube and fitting. Since such relative motion can produce fretting-induced fatigue failure, its reduction will increase the tube joint's lifetime to failure.

In addition, increased residual compressive stresses in the tube will tend to delay the onset of fatigue-induced cracks in the tube wall. Cracks can be produced in the tube wall where it enters the fitting due to the tensile stresses created at that point by repeated bending of the tube, which can occur when the joint is subject to vibration, for example. The residual compressive stresses in the tube joint of the present invention will reduce those tensile stresses and thus increase the fatigue-resistance of the joint. Finally, the tendency of the tube wall not to fill the grooves 18 nearer the end 24 of fitting minimizes the concentration of stresses in the tube wall at the corners of the grooves 18. The present invention achieves this reduction in stress concentration without sacrificing the resistance of the tube joint to axial separation or relative torsional movement of the tube and fitting, since the tube wall 12 more fully penetrates the grooves 18 proximate to the end 22 of the tube 10, that is, in portion A. The more complete penetration of the tube wall 12 into the grooves 18 in portion A does not affect the joint's resistance to fatigue-induced failures, which normally occur almost exclusively in the tube near the end 24 of the fitting.

Figure 3:
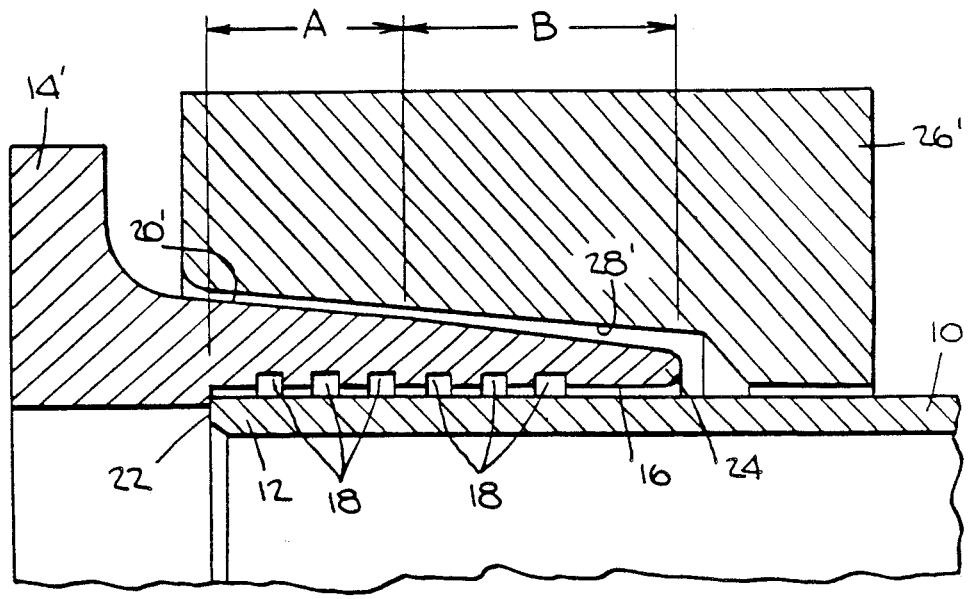
FIG. 3 depicts apparatus for performing another embodiment of the method of the present invention.

FIG. 3 shows an alternative embodiment of the present invention. Parts shown in FIG. 3 that are similar to parts shown in FIGS. 1 and 2 are given similar reference numerals.

The difference between the apparatus shown in FIG. 3 and that shown in FIG. 1 is the configuration of the outside surface of the fitting corresponding to the bore and the facing inner surface of the die. In FIG. 3 the inner surface 28' of the die 26' tapers radially inwardly at a constant angle (exaggerated in FIG. 3). The outside surface 20' of the fitting 14' has two portions. In portion A the inner surface of the die and the outside surface of the fitting taper at the same constant angle. In portion B, the outside surface of the fitting tapers at a larger constant angle than the inside surface of the die. The radial gap between the outside surface 20' of the fitting 14' and the inner surface 28' of the die 26' thus has essentially the same configuration as the gap in the first embodiment shown in FIG. 1. Thus, when the tube wall 12 is expanded, the resulting tube joint will exhibit the same advantageous properties as the tube joint shown in FIG. 2.

Figure 4:
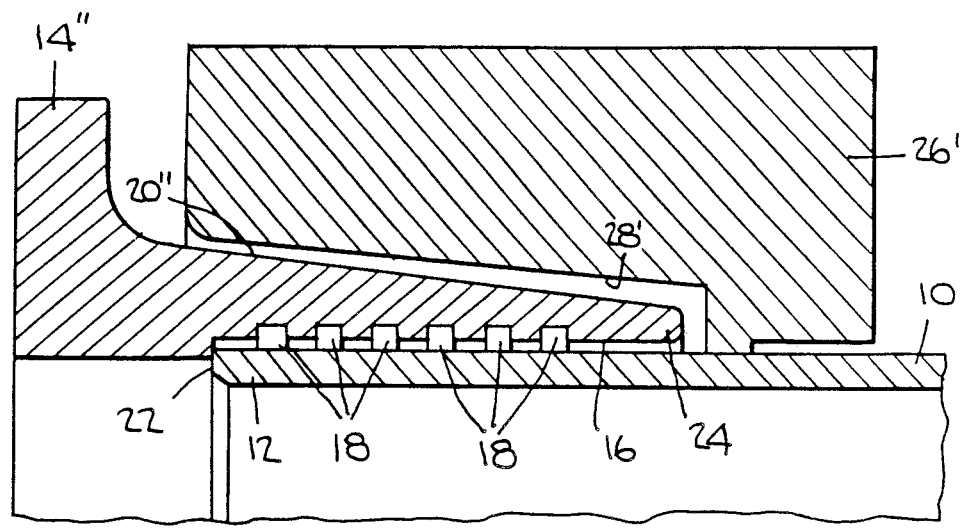
FIG. 4 depicts apparatus for performing still another embodiment of the method of the present invention.

The configurations of the die and fitting surfaces shown in FIGS. 1 and 3 are illustrative, rather than limiting. For example, the die and fitting surfaces may be tapered at constant angles, as shown in FIG. 4 (in which similar parts are given similar reference numerals), so that the radial gap constantly increases axially of the fitting bore toward the end of the fitting. In the resulting tube joint, the residual circumferential stresses on the tube wall increase at a constant rate axially of the bore.

Figure 5:
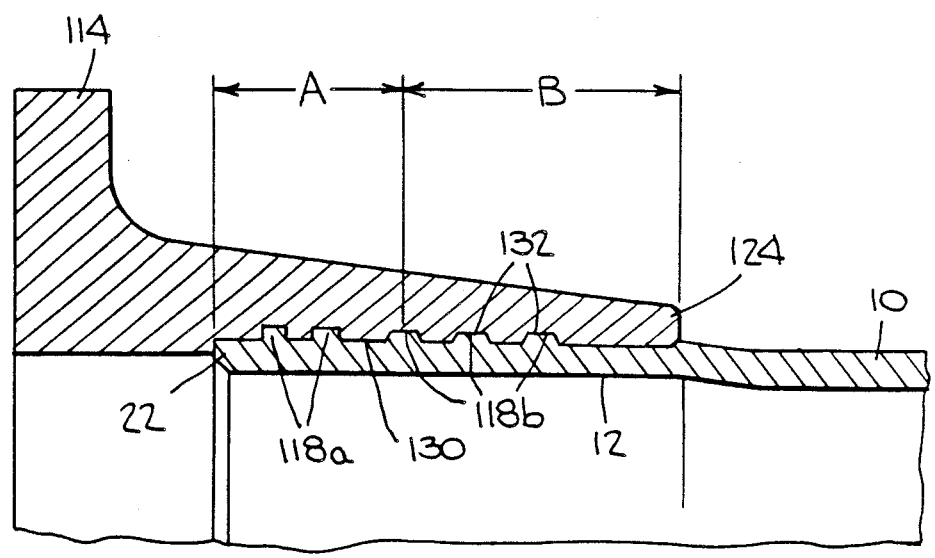
FIG. 5 depicts an alternate embodiment of a fitting that can be used to make the tube joint of the present invention.

FIG. 5 shows a tube joint according to another embodiment of the invention. This embodiment employs a fitting 114 in accordance with the teachings of U.S. Pat. No. 3,711,132, discussed above.

The fitting 114 includes plural grooves 118a and 118b separated from each other and the end 124 of the fitting 114 by land sections 130 that all have the same diameter, adapted to make a sliding fit with the tube 10, as in the embodiments depicted in FIGS. 1, 3, and 4.

The grooves 118b nearest the end 124 have sidewalls that are inclined diverging radially inwardly with a substantial inclination, preferably between 9° and 23°, and most preferably slightly more than 14°. The objective is actually to provide a smooth, rippled surface, although from a manufacturing standpoint it is more practicable to provide discreet, straight-sided grooves having flat bottoms 132 and land sections 130 between adjacent grooves.

The remaining grooves 118a have sidewalls that are substantially perpendicular to the longitudinal axis of the fitting and join the bore with sharp edges.

The tube joint of the present invention as embodied in FIG. 5, for example, can provide a leak-tight connection against fluids and gases. It can seal helium gas at 350 psi to a leak rate of less than $5 \times 10^{-6}$ cc/min. It can also provide a structural joint capable of meeting commonly cited aircraft design specifications, such as MIL-F-85421 for 5000 psi operating pressure or MIL-F-85720 for 8000 psi operating pressure.

To illustrate the superior performance of a tube joint made using the system of the present invention, tube joints like that shown in FIG. 5 were made using fittings and dies as illustrated in FIGS. 1 and 3, with the radial gaps discussed above. For comparison purposes, prior art tube joints were made in accordance with the teachings of U.S. Pat. No. 3,711,132. All of the fittings had three straight-sided grooves 118a and two radially-diverging grooves 118b.

Sample tube joints were made using these fittings and titanium tubing with side wall thicknesses as shown below, which are capable of withstanding high internal pressures. The tube joints were flexure tested in accordance Aerospace Recommended Practice ARP 1185A of the Society of Automotive Engineers. ARP 1185A sets forth a standard flexure test used in specifying fittings in the aerospace industry. In this test a length of tubing has a fitting attached to one end, which is secured in a fixture. The other end is repeatedly deflected at an amplitude that generates a given stress in the tube, as measured by a strain gauge attached to the tube wall proximate to the tube joint, while a hydraulic fluid is held in the tube under a predetermined pressure. The tube is then deflected until fracture or for 10,000,000 cycles, whichever occurs first.

The following table shows the unexpectedly superior results achieved using the present invention as compared to the prior art:

| Joint | Tube Dia. × Wall Thk. | Fluid Pressure | Bending Stress | Cycles to Failure |
|---|---|---|---|---|
| Prior Art[1] | 1" × 0.088" | 5000 psi | 15000 psi | $1.8 \times 10^6$ |
| Invention | 1" × 0.088" | 5000 psi | 15000 psi | $10 \times 10^6$ (NF)[2] |
| Prior Art | 11/16" × 0.070" | 8000 psi | 16500 psi | $0.22 \times 10^6$ |
| Invention | 11/16" × 0.070" | 8000 psi | 16500 psi | $10 \times 10^6$ (NF) |
| Prior Art | 7/16" × 0.045" | 8000 psi | 18500 psi | $2.7 \times 10^6$ and $0.56 \times 10^6$ |
| Invention | 7/16" × 0.045" | 8000 psi | 18500 psi | $10 \times 10^6$ (NF) |

Notes:
[1] Four prior art tube joints were tested; the highest number of cycles to failure, $1.8 \times 10^6$, is listed here.
[2] NF: No failure.

Therefore, the present invention provides a tube joint greatly superior to the prior art in strength and, particularly, in fatigue resistance.

It should be understood that there are numerous variations in the arrangements specifically discussed above that are within the scope of the present invention. For example, the embodiments discussed above all show the outside surface of the fitting tapering radially toward the end of the fitting. This configuration is depicted herein strictly for illustrative purposes, other configurations being possible within the scope of the invention. Likewise, the gap between the inner surface of the die and the outside surface of the fitting can assume numerous shapes other than those shown above. Simply as one example, the taper of both the fitting and the die can vary. In addition, the shape of the grooves in the bore is not limited to the straight-sided and radially-diverging shapes shown nor is the present invention limited to attaching a fitting to the end of a tube. These and other modifications are within the spirit and scope of the present invention, which is defined solely by the appended claims.

What is claimed is:

1. A system for attaching a plastically deformable tube to a fitting with two ends, said fitting having a bore extending into said fitting from one of said ends thereof, said bore forming a sliding fit with an end of said tube when said tube is inserted into said bore from said one end of said fitting, and said bore having plural, axially spaced grooves into which the wall of a portion of said tube at said end thereof is expanded by radial deformation thereof against said bore while said fitting is restrained radially by a die, wherein:
   said die and said fitting have facing surfaces that form a radial gap that is larger proximate to said one end of said fitting than proximate to said end of said tube; and
   said radial gap permits elastic deformation of said fitting during radial expansion of said tube.

2. A system according to claim 1, wherein said tube is a thin-walled metal tube and said fitting is of a hard metal composition.

3. A system according to claim 2, wherein:
   said fitting has an outside surface corresponding to said bore and tapering at a constant angle from said end of said tube to said one end of said bore; and
   said facing surfaces comprise an inner surface of said die and said outside surface of said fitting, said inner surface of said die tapering at a constant angle to provide a constantly increasing radial gap axially toward said one end of said bore.

4. A system according to claim 2, wherein:
   said fitting has an outside surface corresponding to said bore and tapering at a constant angle from said end of said tube to said end of said one bore; and
   said facing surfaces comprise an inner surface of said die and said outside surface of said fitting, said inner surface of said die having a first portion extending from said end of said tube to a predetermined point in said bore, in which first portion said radial gap is substantially constant, and a second portion tapering from said first portion at a constant angle smaller than the constant angle of said outer surface of said fitting to provide an increasing radial gap axially toward said end of said bore.

5. A system according to claim 2, wherein:
   said die has an inner surface tapering at a constant angle; and said facing surfaces comprise said inner surface of said die and an outer surface of said fitting corresponding to said bore, said outer surface of said fitting having a first portion extending from said end of said tube to a predetermined point in said bore, in which first portion said radial gap is substantially constant, and a second portion tapering from said first portion at a constant angle larger than the constant angle of said inner surface of said die to provide an increasing gap axially toward said one end of said bore.

6. A system according to claim 2, 3 or 4, wherein said grooves in said fitting are separated from each other and from said end of said bore by cylindrical land sections having the same diameter adapted to make a sliding fit with said tube before expansion thereof, at least the groove nearest said one end of said bore having sidewalls that are inclined diverging radially inwardly with a substantial inclination, and at least one of the remaining grooves having sidewalls which are substantially perpendicular to the longitudinal axis of said fitting and which terminates in said bore with sharp corners.

7. A system according to claim 2, wherein the material of said tube is chosen from the group consisting essentially of titanium alloys, stainless steel, Inconel and aluminum.

* * * * *